United States Patent
Singh et al.

(10) Patent No.: US 9,565,048 B2
(45) Date of Patent: Feb. 7, 2017

(54) REDUCED PRECISION VECTOR PROCESSING

(71) Applicant: Qualcomm Atheros, Inc., San Jose, CA (US)

(72) Inventors: Shailendra Kumar Singh, Fremont, CA (US); Amitkumar Mahadevan, Edison, NJ (US); Laurent Francis Alloin, Monmouth Beach, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 0 days.

(21) Appl. No.: 14/949,637

(22) Filed: Nov. 23, 2015

(65) Prior Publication Data

US 2016/0149745 A1    May 26, 2016

Related U.S. Application Data

(60) Provisional application No. 62/083,411, filed on Nov. 24, 2014.

(51) Int. Cl.
| | | |
|---|---|---|
| *H04L 27/08* | (2006.01) | |
| *H04L 27/34* | (2006.01) | |
| *H04L 12/28* | (2006.01) | |
| *H04B 3/32* | (2006.01) | |
| *H04M 11/06* | (2006.01) | |

(52) U.S. Cl.
CPC .............. *H04L 27/3405* (2013.01); *H04B 3/32* (2013.01); *H04L 12/2896* (2013.01); *H04M 11/062* (2013.01)

(58) Field of Classification Search
CPC .... H04L 43/0876; H04L 43/028; H04L 43/62; H04L 41/069; H04L 41/22; H04L 12/2896; Y04S 40/166; Y04S 40/168; H04B 3/32; H04M 11/062

See application file for complete search history.

(56) References Cited

U.S. PATENT DOCUMENTS

| | | | |
|---|---|---|---|
| 2003/0103579 A1* | 6/2003 | Webster | ............ H04L 25/03159 375/298 |
| 2005/0074070 A1 | 4/2005 | Betts | |
| 2009/0067556 A1* | 3/2009 | Grayver | ............... H03G 3/3052 375/345 |
| 2011/0080979 A1* | 4/2011 | Duggan | ................ H04L 1/0045 375/340 |

(Continued)

FOREIGN PATENT DOCUMENTS

| | | |
|---|---|---|
| EP | 2755333 A1 | 7/2014 |
| GB | 2467144 A | 7/2010 |
| WO | WO-2014180794 A1 | 11/2014 |

OTHER PUBLICATIONS

ISA/EPO, International Search Report and Written Opinion of the International Searching Authority, Int'l. App. No. PCT/US2015/062295, Feb. 10, 2016, European Patent Office, Rijswijk, NL, 12 pgs.

*Primary Examiner* — Dac Ha
(74) *Attorney, Agent, or Firm* — Holland & Hart LLP

(57) ABSTRACT

Methods, systems, and devices are described for wired communication. In one aspect, a method includes selecting a gain scalar based at least in part on a constellation point distance associated with a constellation mapper for a line and a tone. The method also includes applying the gain scalar to a tone data output signal of a vector processor.

27 Claims, 9 Drawing Sheets

(56) References Cited

U.S. PATENT DOCUMENTS

2012/0224674 A1* 9/2012 Goodson .................. H04B 3/32
　　　　　　　　　　　　　　　　　　　　　　　379/27.01
2013/0076566 A1* 3/2013 Jiang ...................... H01Q 1/246
　　　　　　　　　　　　　　　　　　　　　　　342/373

* cited by examiner

REDUCED PRECISION VECTOR PROCESSING

CROSS REFERENCES

The present Application for Patent claims priority to U.S. Provisional Patent Application No. 62/083,411 by Singh et al., entitled "System and Method for Reduced Precision Vector Processing," filed Nov. 24, 2014, assigned to the assignee hereof, and expressly incorporated by reference herein.

BACKGROUND

Field of the Disclosure

The present disclosure, for example, relates to data communications, and more particularly, to techniques for reduced precision vector processing in wired communication systems, such as but not limited to digital subscriber line (DSL) systems.

Description of Related Art

DSL communications, like other wired communications, suffer from various forms of interference, including but not limited to crosstalk. Vectored DSL systems can be used to mitigate interference and increase the data throughput. For vector processing, signals need to be transported from a modem physical layer (PHY) to a vector processor unit. Lossless (or near lossless) transportation of the data associated with these signals may require large bandwidth. Also, a multiplier width of the vector processor unit can depend on a bitwidth of the signals to be input into the vector processor unit. Generally, reducing the bitwidth of the signals representation introduces quantization noise. Also, in some scenarios, such as but not limited to nonlinear precoding, the signals may have a very high dynamic range and number of bits required for representation of such signals increases accordingly. In situations where only lower precision (e.g., reduced or shorter bitwidth) vector processing resources are available, the use of lower precision vector processor units may introduce significant quantization to signals with high dynamic range.

SUMMARY

The present description discloses techniques for reducing the bit precision requirement of signals that are input to a vector processor. The techniques enable the lossless (or near lossless) transportation of signals with reduced bandwidth at the vector processing interface. The reduced precision incoming signals also results in a corresponding reduction in the bitwidth of vector multipliers in the vector processor. According to these techniques, aspects of vectored DSL systems can be applied to implement, or utilize the existing, reduced bit precision vector processing resources. Aspects of the present disclosure include techniques for partitioning the gain of incoming signals such that computations associated with vector processing can be simplified.

In some examples, a signal is represented as a combination of two reduced precision signals, and the two reduced precision signals are processed in parallel by vector processing resources of a vector processor. Such examples that process two reduced precision signals include the case of nonlinear precoding (NLP). In NLP cases, the input to the vector processing interface can be represented as a combination of two signal streams. The bit precision requirement of both signal streams can be reduced. In some implementations, the two signal stream are parallel processed by the same or similar vector processing resources of the vector processor. In this manner, the results of the vector processor from each of the signal streams are combined to obtain the desired output signal.

Additionally, according to the techniques described herein, the bit precision requirement of vector processing resources is minimized while introducing almost no quantization noise. As such, when spare vector processing resources are made available by efficiency gains due to the reduced bit precision requirement, the resources can be used in parallel to process signals with higher dynamic range.

A method for wired communication is described. The message includes selecting a gain scalar based at least in part on a constellation point distance associated with a constellation mapper for a line and a tone. The gain scalar is then applied to a tone data output signal of a vector processor.

A wired communication device is described. The wired communication device includes a constellation mapper, a vector processor, a gain selector, and at least one gain component. The gain selector is to select a gain scalar based at least in part on a constellation point distance associated with the constellation mapper for a line and a tone, and the at least one gain component is to apply the gain scalar to a tone data output signal of the vector processor.

Another wired communication device includes means for selecting a gain scalar based at least in part on a constellation point distance associated with a constellation mapper for a line and a tone, and means for applying the gain scalar to a tone data output signal of a vector processor.

A non-transitory computer-readable medium storing code for wireless communication is described. The code of the non-transitory computer-readable medium includes computer-readable code that, when executed, causes a device to select a gain scalar based at least in part on a constellation point distance associated with a constellation mapper for a line and a tone; and apply the gain scalar to a tone data output signal of a vector processor.

Regarding the above-described method, wired communication devices, and non-transitory computer-readable medium, a gain vector can be selected based at least in part on the gain scalar, and the gain vector can be applied to a normalized tone data output signal vector of the constellation mapper. The gain vector can be selected based at least in part on an integer multiplier component, for example using one or more of: a rounding operation, a ceiling operation, an exponent of a rounding operation of a log value, and an exponent of a ceiling operation of a log value.

A remaining gain vector can be determined based at least in part on the gain scalar, and the remaining gain vector can be applied to a precoder of the vector processor. In some cases, a constellation point of the constellation mapper is represented with integer values.

A nonlinear part gain scalar can be selected based at least in part on a modulo size associated with the constellation mapper for the line and the tone, and the nonlinear part gain scalar can be applied to a nonlinear adjustments output signal of the vector processor. The vector processor can include a first vector processing component for processing an intermediate tone data signal vector and a second vector processing unit for processing an intermediate nonlinear adjustments signal vector. The nonlinear part gain vector can be selected based at least in part on the nonlinear part gain scalar, and the nonlinear part gain vector can be applied to a normalized nonlinear adjustments output signal vector of a nonlinear precoding processor. The sum of the gain-applied tone data output signal and the nonlinear part gain-applied nonlinear adjustments nonlinear adjustments output signal can then be summed.

A remaining gain vector can be determined based at least in part on the gain scalar, and a remaining nonlinear part gain vector can be determined based at least in part on the nonlinear part gain scalar. In some cases, the remaining gain vector is applied to a precoder of a first vector processing component of the vector processor for processing an intermediate tone data signal vector, and the remaining nonlinear part gain vector is applied to a precoder of a second vector processing component of the vector processor for processing an intermediate nonlinear adjustments signal vector. The gain scalar and the nonlinear part gain scalar can be selected such that the remaining gain vector and the remaining nonlinear part gain vector are the same, and the remaining gain vector can be applied to a precoder of the vector processor. The remaining nonlinear part gain vector can be applied to the precoder of the vector processor at a different time than the remaining gain vector.

In some accordance with some aspects, the above-described method, wired communication devices, and non-transitory computer-readable medium are implemented in DSL communication systems and devices.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
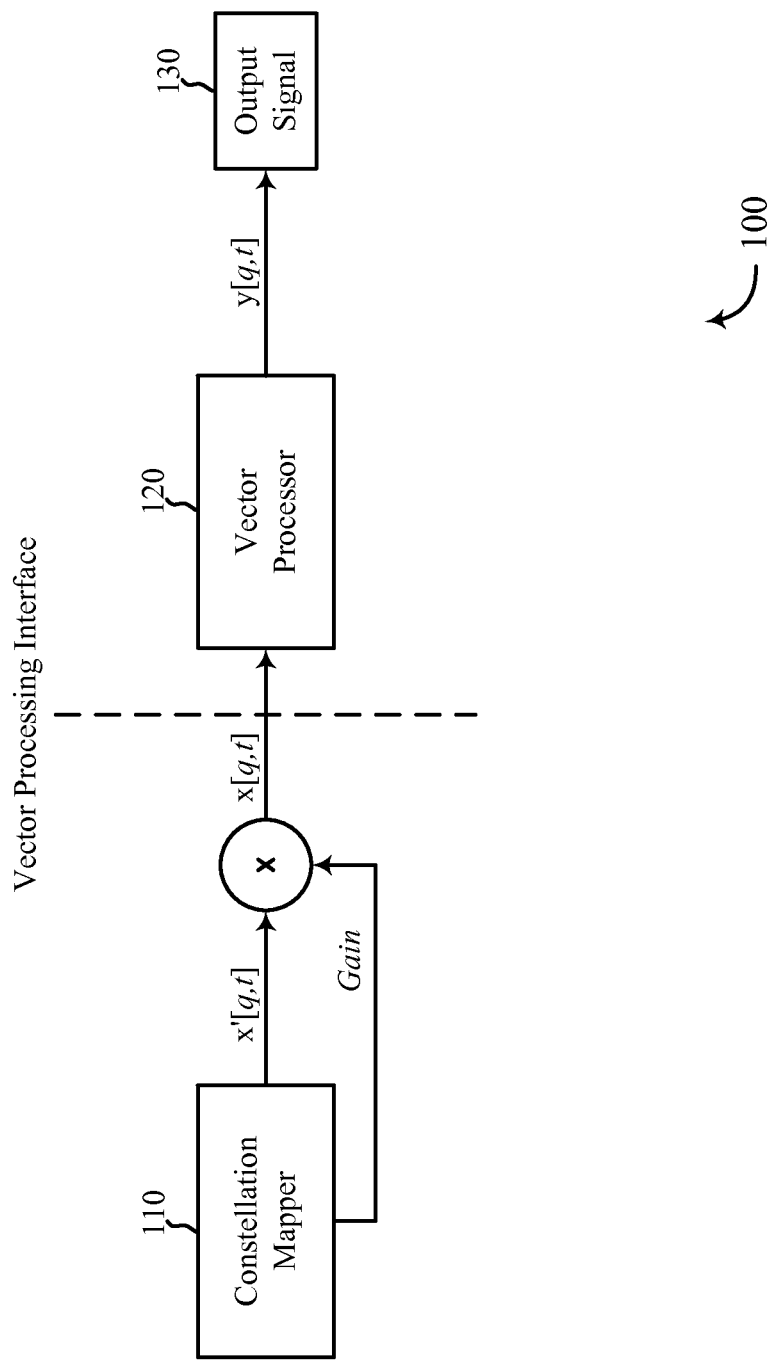
FIG. 1 illustrates an example of a vector processing architecture for use in a communication system in accordance with various aspects of the present disclosure.

According to aspects of the present disclosure, a gain selector of a line card (e.g., a line card of a DSL access multiplexer (DSLAM)) selects a gain scalar based at least in part on a constellation point distance associated with the constellation mapper for a line and a tone. The gain selector also selects a gain vector based at least in part on the gain scalar. A gain component of the line card applies the gain vector to a normalized signal vector of the constellation mapper. The gain component also applies the gain scalar to an output signal of a vector processor (e.g., a vectoring card of a DSLAM). In this regard, gain partitioning techniques allow the signals to be mapped on an integer grid representation for reduced precision representation. The partitioned gains are redistributed to enable the desired computational benefits of the vector processor. These and additional aspects of the present disclosure reduce the bit precision requirement of signals that are input to the vector processor. As such, lossless (or near lossless) transportation of signals (e.g., tone data signals) with reduced bandwidth at the vector processing interface.

In the absence of crosstalk, the existing copper telephone infrastructure can in theory be utilized to carry from tens to hundreds of megabits per second over distances up to approximately 5,000 feet using discrete multitone (DMT) digital subscriber line (DSL) modem technology. DMT modems divide the available bandwidth into many sub-carriers that are synchronized and independently modulated with digital quadrature amplitude modulation (QAM) data to form an aggregate communication channel between the network and subscriber. DMT-based DSL systems typically use Frequency Division Multiplexing (FDM) and assign particular sub-carriers to either downstream (that is, from network/CO to subscriber/user) or upstream (from subscriber/user to network/CO) directions. This FDM strategy limits near end crosstalk (NEXT). DMT systems are typically very robust in the presence of radio frequency interference (RFI) and other types of frequency-selective noise (or interference) or channel dispersion, because each sub-carrier can be independently modulated with an appropriate amount of data and power in order to meet the system requirements and the desired bit error rate.

Aspects of the present disclosure reduce the bit precision requirement of signals (e.g., tone data in a digital QAM data format) to reduce the required vector processing resources and optimize vectored DMT systems (e.g., DMT-based DSL systems and like systems). In this manner, by reducing the number of bits to represent a signal, nonlinear adjustments signals can be processed in a parallel using extra or freed vector processing resource. Similar techniques with the same (or lesser) bit precision by partitioning gain (e.g., gain scalars and gain vectors) as used with respect to the signal can be applied in processing the nonlinear adjustments signal by partitioning vector processing resource or components. Consequently, a lossless (or near lossless) signal that includes nonlinear adjustments can be transported with reduced bit precision and bandwidth by reusing the extra or freed vector processing resources.

It is to be appreciated that, while the present disclosure describes the techniques for reducing the bit precision requirement of signals in the context of vectored DMT systems, aspects of the present disclosure are equally applicable to other communication systems. For example, aspects of the present disclosure apply to various wired communication technologies including, but not limited to, FDM and orthogonal frequency division multiplexing (OFDM) systems associated with coaxial cable communications, power line communications, Ethernet communications, and other wired communication systems where appropriate. Additionally, aspects of the present disclosure can apply to wireless communication systems, for example, where QAM-based schemes are utilized. As such, the scope of the present disclosure is not limited to the specific examples provided with respect to vectored DMT systems.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring first to FIG. 1, a block diagram illustrates an example of a vector processing architecture 100 for use in vectored DMT or OFDM system (such as, but not limited to, a vectored DMT-based DSL system), in accordance with various aspects of the present disclosure. The vector processing architecture 100 includes a constellation mapper 110, a vector processor 120, and an output signal source 130.

For vectored DMT systems in the downstream, the signals (e.g., tone data) need to be transported from the output of constellation mapper 110 to vector processor 120. The downstream signals are then processed by the vector processor 120. Reducing the number of bits to represent the signals can reduce the bandwidth requirement and, consequently, the number of bits required for the vector processing operation. In FIG. 1, the block diagram of the vectored DMT system is illustrated for one tone (e.g. frequency). For tone q of the t-th DMT symbol, define:

$$x'[q, t] = \begin{bmatrix} x'_1[q, t] \\ \vdots \\ x'_N[q, t] \end{bmatrix}$$

to be the mapper output, one corresponding to each line in the vector group.

Similarly, define:

$$\text{Gain}[q] = \begin{bmatrix} \text{Gain}_1[q] \\ \vdots \\ \text{Gain}_N[q] \end{bmatrix}$$

to be the transmit gains corresponding to each line.

Outputs of the constellation mapper 110 are normalized to the unit energy. In other words, elements of x'[q, t] are scaled by transmit gains before being processed by the vector processor 120. The dynamic range of the constellation mapper output signal vector x'[q, t] and Gain decides the precision required for signal vector x[q, t]. Signal vector x[q, t] is input to the vector processor 120 and the output of the vector processor 120 is expressed as:

$$y[q,t]=VP(x[q,t],q)=P*x[q,t]$$

$$y[q,t]=P[q]*\text{diag}(\text{Gain}[q])*x'[q,t],$$

where diag(Gain[q]) is diagonal matrix with diagonal elements from vector Gain[q]. Output signal vector y[q, t] is available at output signal source 130.

The constellation points (i.e., the signals of vector x'[q, t]) are selected from a grid of an integer multiple of half the distance between constellation points. The distance between constellation points depends on the bits loading of the tone. Utilizing this structure of the constellation mapper output and splitting the transmit Gain vector suitably (e.g., so that a part of it could be applied to the precoder), the required precision for x[q, t] can be reduced considerably.

Figure 2:
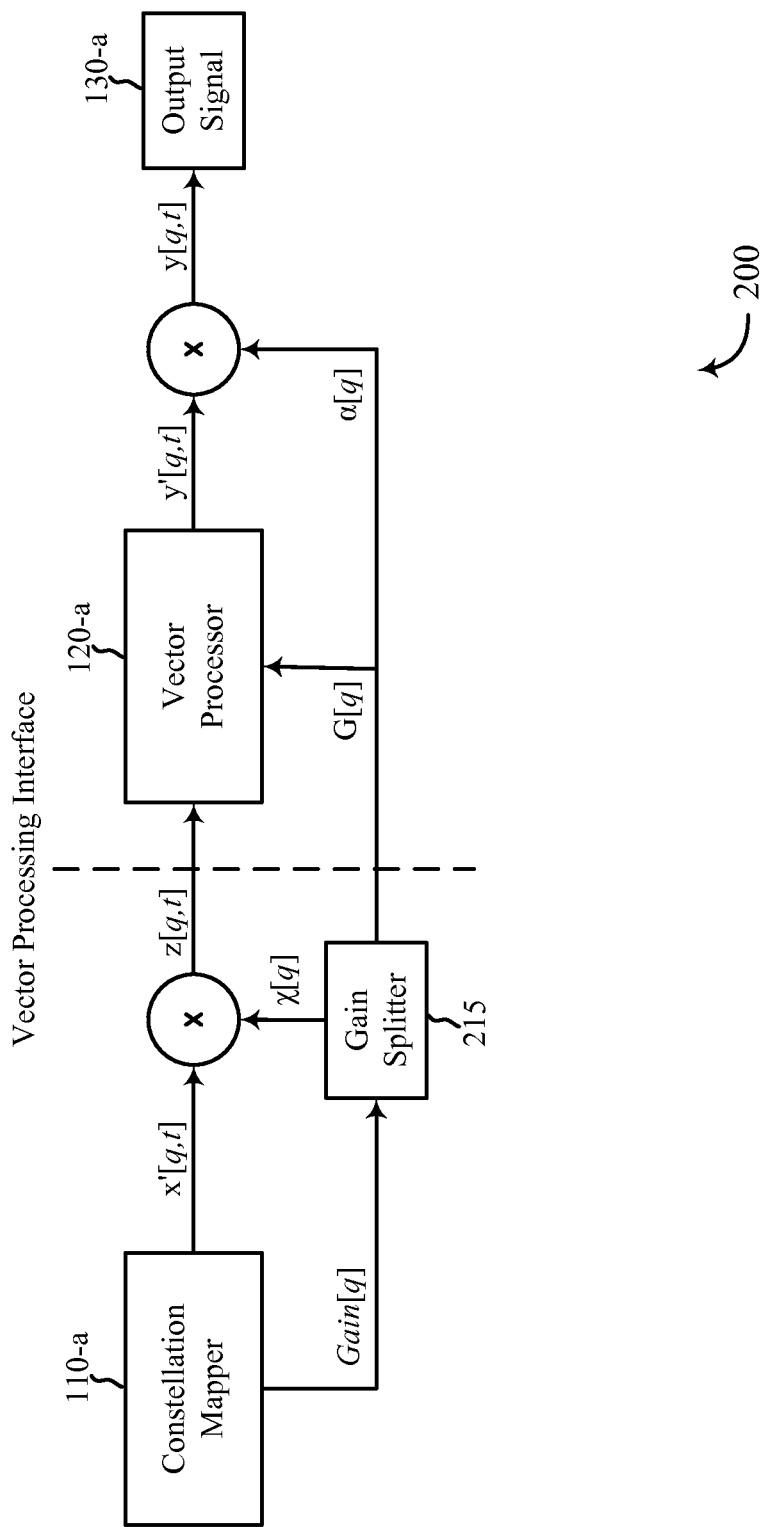
FIG. 2 illustrates an example of a reduced precision vector processing architecture that supports reduced precision vector processing in accordance with various aspects of the present disclosure.

FIG. 2 illustrates an example of a reduced precision vector processing architecture 200 that supports reduced precision vector processing in accordance with various aspects of the present disclosure. The reduced precision vector processing architecture 200 includes a constellation mapper 110-a, a gain splitter 215, a vector processor 120-a, and an output signal source 130-a. The example reduced precision vector processing architecture 200 shown in FIG. 2 is illustrated with respect to constellation mapper 110-a, vector processor 120-a, and output signal source 130-a, which are respective examples of similar devices of FIG. 1.

In accordance with some aspects, $2d_i[q]$ is defined to be the constellation point distance for the constellation mapper 110-1 of line i for the q th tone. Gain splitter 215 selects scalar gain $\alpha[q]$ such that $$0 < \alpha[q] < \min_{1 \le i \le N} (2d_i[q])$$

and gain vector $$X_i = I\left(\frac{d_i[q]}{\alpha[q]}\right) * \frac{1}{d_i[q]}$$

where I(•) represents an integer multiplier as a function of $$\frac{d_i[q]}{\alpha[q]}.$$

Some of the possible examples for function I(•) include a rounding operation, a ceiling operation, an exponent of a rounding operation of a log value, and an exponent of a ceiling operation of a log value. For example, the function I(•) can be $$2^{round}\left[\log_2\left(\frac{d_i[q]}{\alpha[q]}\right)\right]$$

Gain splitter 215 applies the gain vector $$\chi[q] = \begin{bmatrix} \chi_1[q] \\ \vdots \\ \chi_N[q] \end{bmatrix}$$

to the output of constellation mapper 110-a. The resulting vector (e.g., an intermediate vector in the transportation process) can be expressed as $$z[q, t] = \begin{bmatrix} \chi_1[q] * x'_1[q, t] \\ \vdots \\ \chi_N[q] * x'_N[q, t] \end{bmatrix} = \begin{bmatrix} z_i[q, t] \\ \vdots \\ z_i[q, t] \end{bmatrix}$$

where $z_i[q, t]$'s are complex integers, the range and bits required to represent $z_i[q, t]$ are determined by the max bit loading for any user and the value of scalar gain α[q]. The scalar gain α[q] is applied at the output of the vector processor 120-*a*, while remaining gain vector $G_i[q]$ (as given below) can be applied to and absorbed in the ith column of the precoder of vector processor 120-*a*.

$$G_i[q] = \frac{1}{\chi_i[q]} * \frac{1}{\alpha[q]} \text{Gain}_i[q]$$

$$\frac{G_i[q]}{\text{Gain}_i[q]} = \left(\frac{d_i[q]}{\alpha[q]}\right) / R\left(\frac{d_i[q]}{\alpha[q]}\right)$$

The value of scalar gain α[q] is selected such that the performance impact (if any) due to the change in the precoder from P[q] to P[q]*G[q], is minimal. The value of scalar gain α[q] can be used to tradeoff between $G_i[q]/\text{Gain}_i[q]$ and precision requirement of $x_i[q, t]$. The smaller value of scalar gain α[q] will lead $G_i[q]/\text{Gain}_i[q]$ ratio closer to unity. One example of the possible values of scalar gain α[q] is $$\alpha[q] = \min_{1 \leq i \leq N}(d_i[q]).$$

Output signal vector y[q, t], after applying the scalar gain α[q], is available at output signal source 130.

Figure 3:
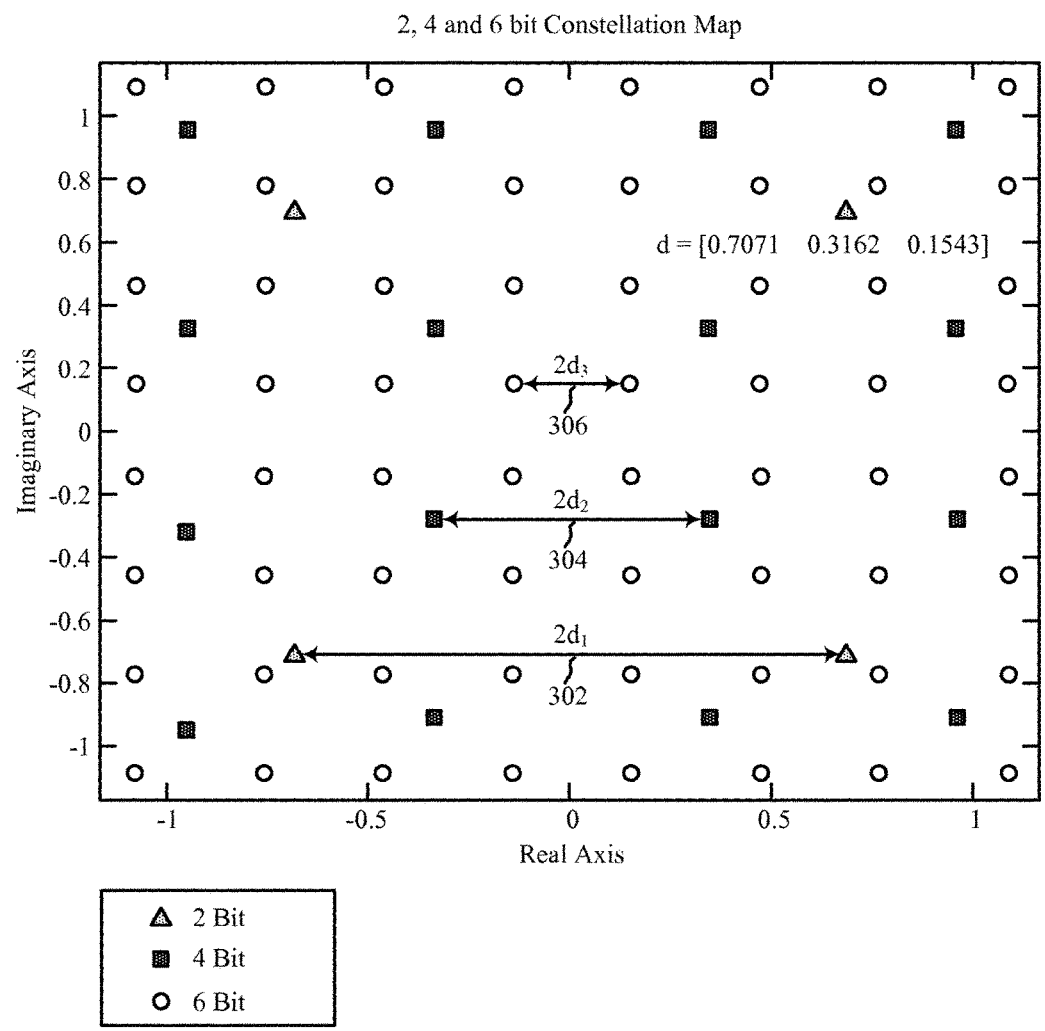
FIG. 3 illustrates an example of a constellation map (including 2, 4, and 6 bit constellation patterns) that supports reduced precision vector processing in accordance with various aspects of the present disclosure.

FIG. 3 illustrates an example of a constellation map 300 that supports reduced precision vector processing in accordance with various aspects of the present disclosure. Constellation map 300 includes examples of 2, 4, and 6 bit constellation patterns. However, aspects of the reduced precision vector processing techniques are not limited to these example constellation patterns and may apply to other constellation patterns of QAM schemes (e.g., 128-QAM and 256-QAM) and other discrete structure signaling concepts.

With reference to FIG. 2, in one example, three lines in the system utilizing reduced precision vector processing architecture 200 are loaded with 2, 4, and 6 bits of information on a given tone. The output of the constellation mapper 110-*a* is normalized to unit energy. As shown in FIG. 3, the constellation points of constellation map 300 are fractional complex numbers. Examples of constellation point distances for the three lines are shown in FIG. 3 and include 2-bit constellation point distance 302 as $2d_1$, 4-bit constellation point distance 304 as $2d_2$, and 6-bit constellation point distance 306 as $2d_3$.

All of the lines can be assumed to have unity transmit Gain to applied to the signals of the respective lines. Using the reduced precision vector processing techniques described herein, the various constellation points of constellation map 300 can be represented by integers with little to no loss of information. An example of reduced precision, integer plotted constellation map 400 is shown in FIG. 4.

Figure 4:
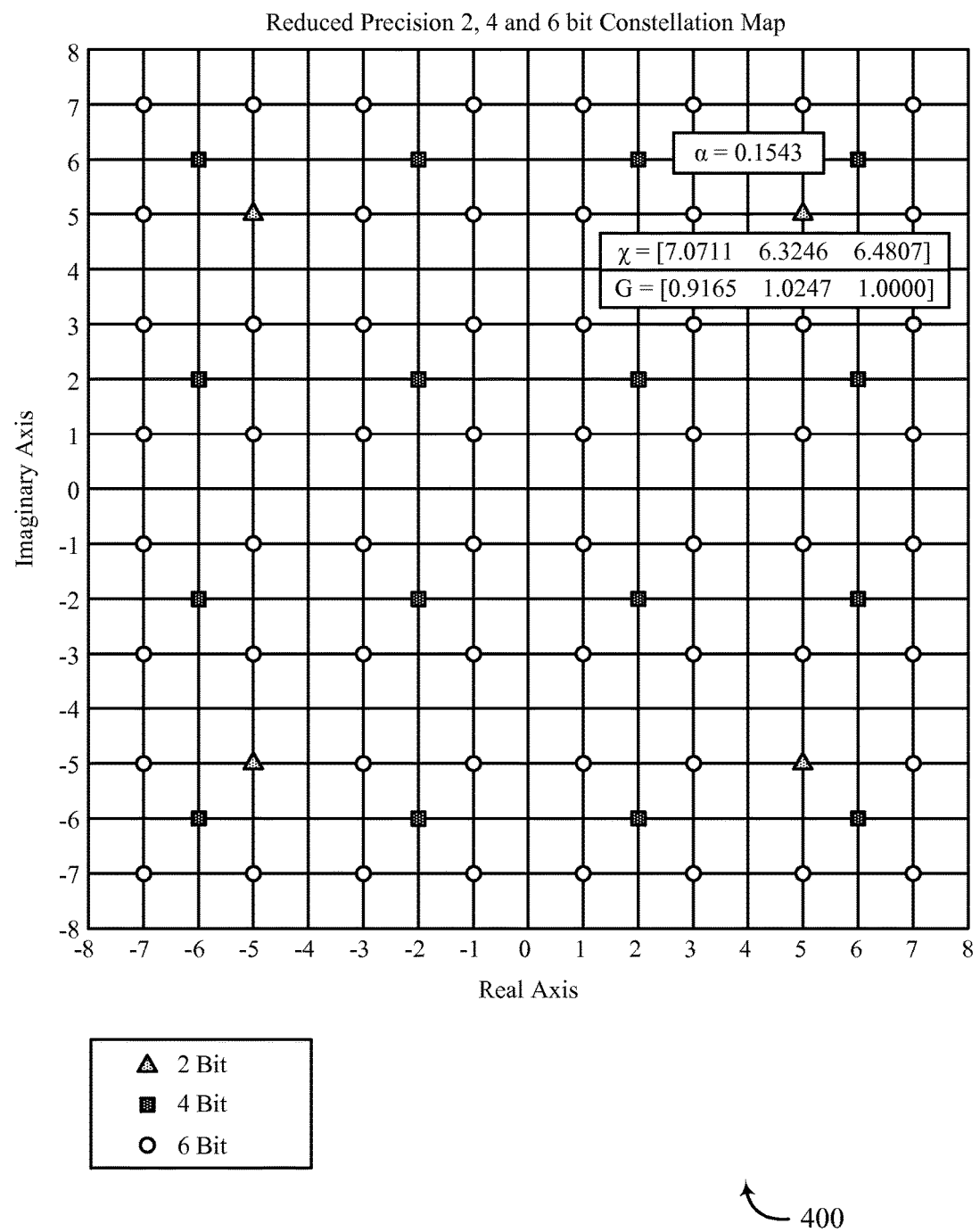
FIG. 4 illustrates an example of a reduced precision, integer plotted constellation map (including 2, 4, and 6 bit constellation patterns) that supports reduced precision vector processing in accordance with various aspects of the present disclosure.

In one example of FIG. 4, only 4 bits per dimension (e.g., real and imaginary axis, totaling 8 bits for complex numbers) are required to represent the reduced precision tone data in a lossless manner. For example, if the max bit loading on a tone is m bits, then with the reduced precision vector processing techniques described herein, output signals with reduced precision of the constellation mapper 110-*a* can be represented with $$2 * \text{ceil}\left[\frac{m}{2} + 1\right]$$

bits only.

Figure 5:
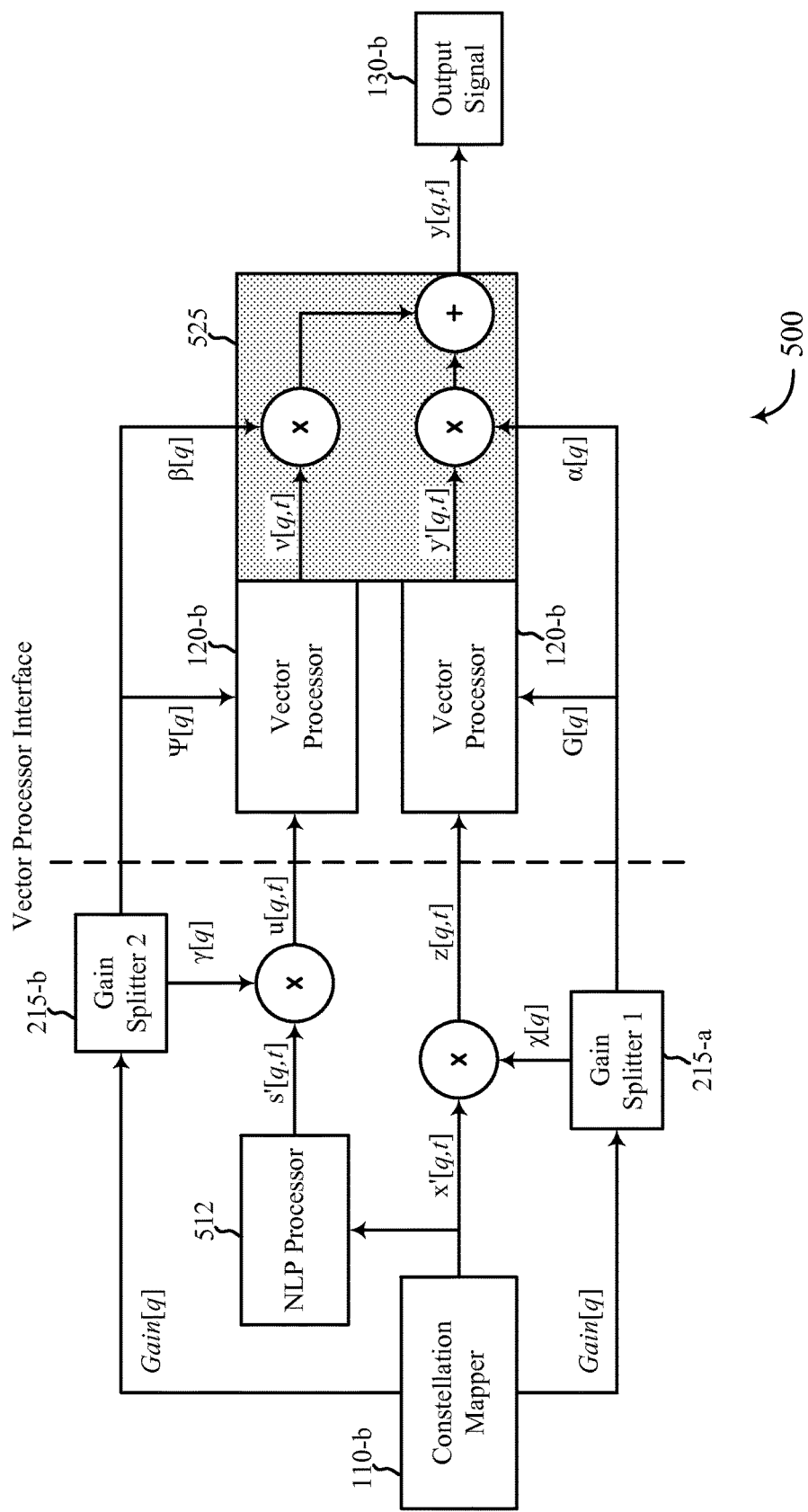
FIG. 5 illustrates an example of a parallel-computation, reduced-precision vector processing architecture for NLP cases that supports parallel computation and reduced precision vector processing in accordance with various aspects of the present disclosure.

FIG. 5 illustrates an example of a parallel-computation, reduced-precision vector processing architecture 500 for NLP cases that supports parallel computation and reduced precision vector processing in accordance with various aspects of the present disclosure. The parallel-computation, reduced-precision vector processing architecture 500 includes a constellation mapper 110-*b*, an NLP processor, a first gain splitter 215-*a*, a second gain splitter 215-*b*, a vector processor 120-*b*, and an output signal source 130-*b*. The example parallel-computation, reduced-precision vector processing architecture 300 shown in FIG. 5 is illustrated with respect to constellation mapper 110-*b*, first gain splitter 215-*a*, second gain splitter 215-*b*, vector processor 120-*b*, and output signal source 130-*b*, which are respective examples of similar devices of FIGS. 1 and 2.

In case of NLP, a nonlinear adjustments signal s[q, t] is added to the tone data signal before vector processing so that the output of the vector processor 120-*b* does not violate the specified power level. The nonlinear adjustments signals $s_i$ [q, t] are generated using a modulo operation. The modulo size is a number larger than size of the constellation map from which $x_i$ [q, t] are generated. The precision requirement for x[q, t] is the same as described in the previous examples described with respect to FIG. 2. In some examples, the reduced precision vector processing techniques described herein can be validly applied to the combined signal x[q, t]+s[q, t] with appropriate choice of the nonlinear adjustments signal s[q, t]. In these examples, the nonlinear adjustments signal s[q, t] can be selected such that the nonlinear adjustments signal can be represented in the form of integer multiples of the constellation point distance.

However, because the integer multiple values for $s_i$ [q, t] are typically larger (e.g., larger than constellation map sizes of the signal x[q, t], the constellation mapper 110-*b* would be required encode extra bits. If the extra bits for tone data signal are not provisioned, a parallel computation using extra vector processing resource of vector processor 120-*b* with similar (or lesser) precision can be performed using similar approach for the nonlinear adjustments signal s[q, t]. According to some examples, the output signal vector y[q, t] using vector processing (VP) resources is represented as follows:

*y[q,t]=VP(x[q,t]+s[q,t],q)=VP(x[q,t],q)+VP(s[q,t],q)*

*y[q,t]=P[q]x[q,t]+P[q]s[q,t]*

*y[q,t]=P[q]\*diag(Gain[q])\*x'[q,t]+P[q]\* diag(Gain[q])s'[q,t],* where diag(Gain[q]) is diagonal matrix with diagonal elements from vector Gain[q]. The nonlinear adjustments signals $s_i$ [q, t] can also be treated in the same manner as $x_i$ [q, t] except that, in such cases, the distance between the constellation points is replaced by the size of the modulo operation (e.g., using an approximation of a constellation map size). In this manner, the nonlinear adjustments signals $s_i$ [q, t] can be viewed as another signal coming from constellation mapper 110-*b* such that the nonlinear adjustments signals $s_i$ [q, t] has a larger distance between constellation points of a constellation map.

The tone data signal x[q, t], remaining gain vector G[q], gain vector χ[q], and scalar gain α[q] for the first vector processing component of vector processor 120-*b* are same as described in the above example with respect to FIG. 2. The nonlinear processed part of the nonlinear adjustments signal s[q, t] is an integer multiple of the modulo sizes. In these nonlinear processed part examples, unity gain may be similarly applied as with tone data signal x[q, t]. Modulo sizes are signed integers including zeros, and can be similarly represented as discussed with respect to constellation maps herein. For example, selecting nonlinear part gain scalar $\beta[q]=1.2344$, results in a nonlinear part gain vector $\gamma[q]=$ [0.7071 0.7906 0.8101] while remaining nonlinear part gain vector $\Psi[q]=$[1.1456 1.0247 1.0000]. In this regard, scalar gain scalar gain $\alpha[q]$ (shown as 0.1543 in FIG. 4) can be different from nonlinear part gain scalar $\beta[q]$, which is related to shift values.

According to some aspect, parallel processing is used to partition the various gains such that remaining gain vector G[q] and remaining nonlinear part gain vector $\Psi[q]$ are the same (e.g., by suitably choice of scalar gain $\alpha[q]$ and the modulo size for tone q, $M_d[q]$). In these cases, the same vector processing resources of vector processor 120-b can be reused by operating the vector processor 120-c at higher speeds.

It is to be appreciated that, with some modifications (as would be apparent to a skilled person given the benefit of the present disclosure), the reduced precision vector processing techniques described herein can be applied to upstream signals, for example, by splitting the incoming signals as combination of a course grid and a small difference signal (e.g., as represented with respect to the course grid).

Additionally, the techniques for reducing the bit precision requirement of signals are applicable for any signals having discrete structure characteristics. For example, while the output signals of constellation mapper 110-b form a discrete grid with respect to a complex number plane, the present disclosure is not limited in this manner. In some examples, when signals do not have a discrete structure (or the signals are a combination of signals each having discrete grid), such signals could be divided into multiple streams of structured signals and a low dynamic difference signal for reduced precision representation. The multiple streams of reduced precision signals can be processed in parallel and then combined to get the desired output signal. In cases involving NLP processing or preprocessing, the incoming signal can be viewed as a combination or summation of two signals having different discrete structures. In this regard, similar vector processing components of vector processor 120-c can be used for parallel processing of signals with little additional processing and/or associated components.

Figure 6A:
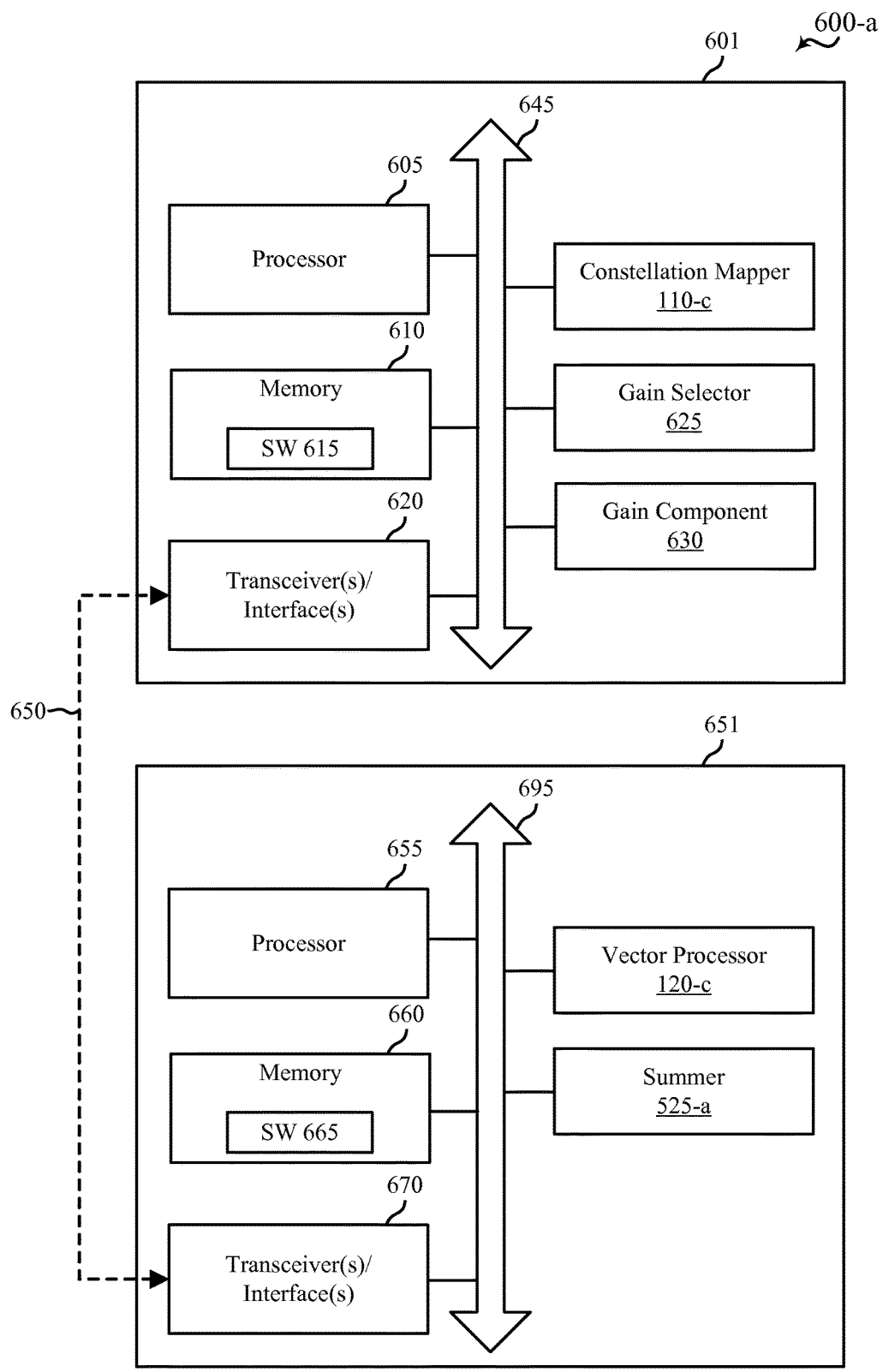
FIGS. 6A and 6B show block diagrams of examples of a vectoring module that support reduced precision vector processing in accordance with various aspects of the present disclosure.

FIG. 6A shows a block diagram 600-a of an example of a vectoring data communication architecture including line card 601 and vectoring card 651 that supports reduced precision vector processing in accordance with various aspects of the present disclosure, and with respect to FIGS. 1-5. Line card 601 and vectoring card 651 operate as part of a vectored DMT-based DSL system (e.g., as cards of a DSLAM). It is to be understood that, in some implementations, the component and functions of line card 601 and vectoring card 651 can be included on a single card, circuit board, or the like.

The line card 601 includes a processor 605, a memory 610, one or more transceivers or interfaces 620, a constellation mapper 110-c, a gain selector 625, and a gain component 630. The processor 605, memory 610, transceiver(s)/interface(s) 620, constellation mapper 110-c, gain selector 625, and gain component 630 are communicatively coupled with a bus 645, which enables communication between these components.

The processor 605 is an intelligent hardware device, such as a central processing unit (CPU), a microcontroller, an application-specific integrated circuit (ASIC), etc. The processor 605 processes information received through the transceiver(s)/interface(s) 620 and information to be sent to the transceiver(s)/interface(s) 620 for transmission to other cards or devices. The transceiver(s)/interface(s) 620 are communicatively coupled to vectoring card 651 via communication link 650. In some implementations, communication link 650 is an optical interconnect.

The memory 610 stores computer-readable, computer-executable software (SW) code 615 containing instructions that, when executed, cause the processor 605 or another one of the components of line card 601 to perform various functions described herein, for example, selecting a gain scalar based at least in part on a constellation point distance and a tone and applying the gain scalar to a tone data output signal.

The constellation mapper 110-c, gain selector 625, and gain component 630 implement the features described with reference to FIGS. 1-5, as further explained below in the example methods disclosed herein. In some implementations, gain selector 625 and gain component 630 can include multiple gain selectors and gain components, and can be incorporated in one or more of the gain splitters 215 described and illustrated in FIGS. 2 and 5.

The vectoring card 651 includes a processor 655, a memory 660, one or more transceivers or interfaces 670, a vector processor 120-c, and a summer 525-a. The processor 655, memory 660, transceiver(s)/interface(s) 670, vector processor 120-c, and summer 525-a are communicatively coupled with a bus 695, which enables communication between these components.

The processor 655 is an intelligent hardware device, such as a central processing unit (CPU), a microcontroller, an application-specific integrated circuit (ASIC), etc. The processor 655 processes information received through the transceiver(s)/interface(s) 670 and information to be sent to the transceiver(s)/interface(s) 670 for transmission to other cards or devices. The transceiver(s)/interface(s) 670 are communicatively coupled to line card 601 via communication link 650.

The memory 660 stores computer-readable, computer-executable software (SW) code 665 containing instructions that, when executed, cause the processor 655 or another one of the components of line card 601 (e.g., vector processor 120-c) to perform various functions described herein, for example, the vector processor 120-c can comprise a first vector processing component for processing an intermediate tone data signal vector and a second vector processing component for processing an intermediate nonlinear adjustments signal vector.

The vector processor 120-c and summer 525-a implement the features described with reference to FIGS. 1-5, as further explained below in the example methods disclosed herein. Vector processor 120-c can include multiple vector processing units or components that may perform a same function in combination and/or perform one or more different functions.

In accordance with some aspects of the disclosure, vector processing can be performed such that two or more signal streams are input to vector processor 120-c. In this regard, vector processor 120-c can be converted such that portions thereof can support various vector processing tasks or functions. For example, a 48×48p G.fast compliant 106 MHz vector processor can be converted to a 24×24p G.fast 212 MHz with NLP whereby a first vector processing module is configured a 24×24p as a 0-106 MHz linear precoder, a second vector processing module is configured a 24×24p as a 106-212 MHz linear precoder, a third vector processing module is unused as nonlinear precoding may be unnecessary for 0-106 MHz, and a fourth vector processing module is configured a 24×24p NLP preprocessor for the second vector processing module. In this manner, some of the vector processing components of vector processor 120-*c* can be enhanced and used to support NLP implementations.

Again, FIG. 6A shows only one possible implementation of a device executing the features of FIGS. 1-5. While the components of FIG. 6A are shown as discrete hardware blocks (e.g., ASICs, field programmable gate arrays (FPGAs), semi-custom integrated circuits, etc.) for purposes of clarity, it will be understood that each of the components may also be implemented by multiple hardware blocks adapted to execute some or all of the applicable features in hardware. Alternatively, features of two or more of the components of FIG. 6A may be implemented by a single, consolidated hardware block. For example, a single transceiver 620 chip may implement the processor 605, constellation mapper 110-*c*, gain selector 625, and gain component 630.

Figure 6B:
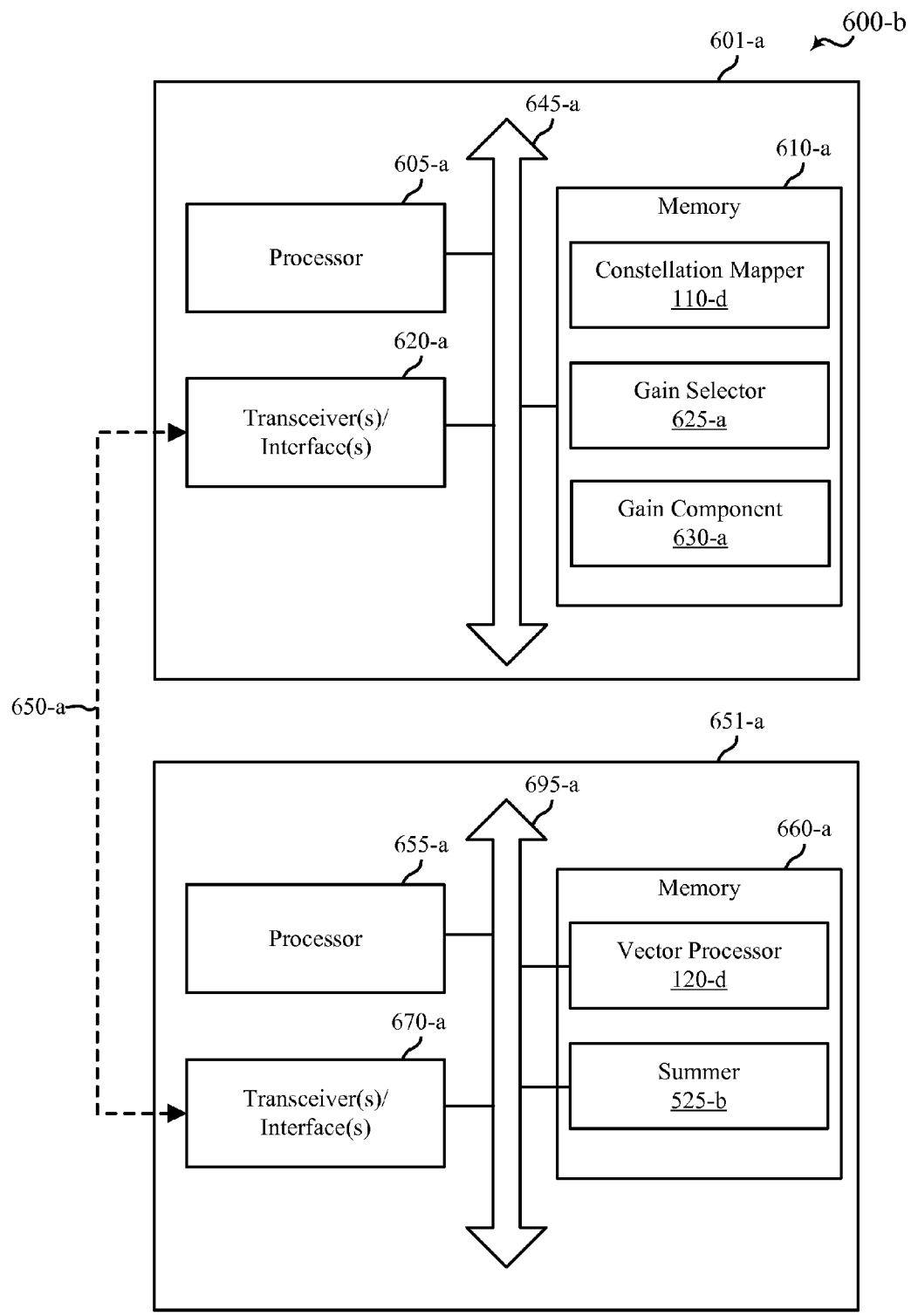

In still other examples, the features of each component may be implemented, in whole or in part, with instructions embodied in a memory, formatted to be executed by one or more general or application-specific processors. For example, FIG. 6B shows a block diagram 600-*b* of another example of a vectoring data communication architecture that supports reduced precision vector processing. Line card 601-*a* is configured such that the features of the constellation mapper 110-*d*, gain selector 625-*a*, and gain component 630-*a* are implemented as computer-readable code stored on memory 610-*a* and executed by one or more processors 605-*a*. Similarly, vectoring card 651-*a* is configured such that the features of the vector processor 120-*d* and summer 525-*b* are implemented as computer-readable code stored on memory 660-*a* and executed by one or more processors 655-*a*. Other combinations of hardware/software may be used to perform the features of one or more of the components of FIGS. 6A and 6B.

Figure 7:
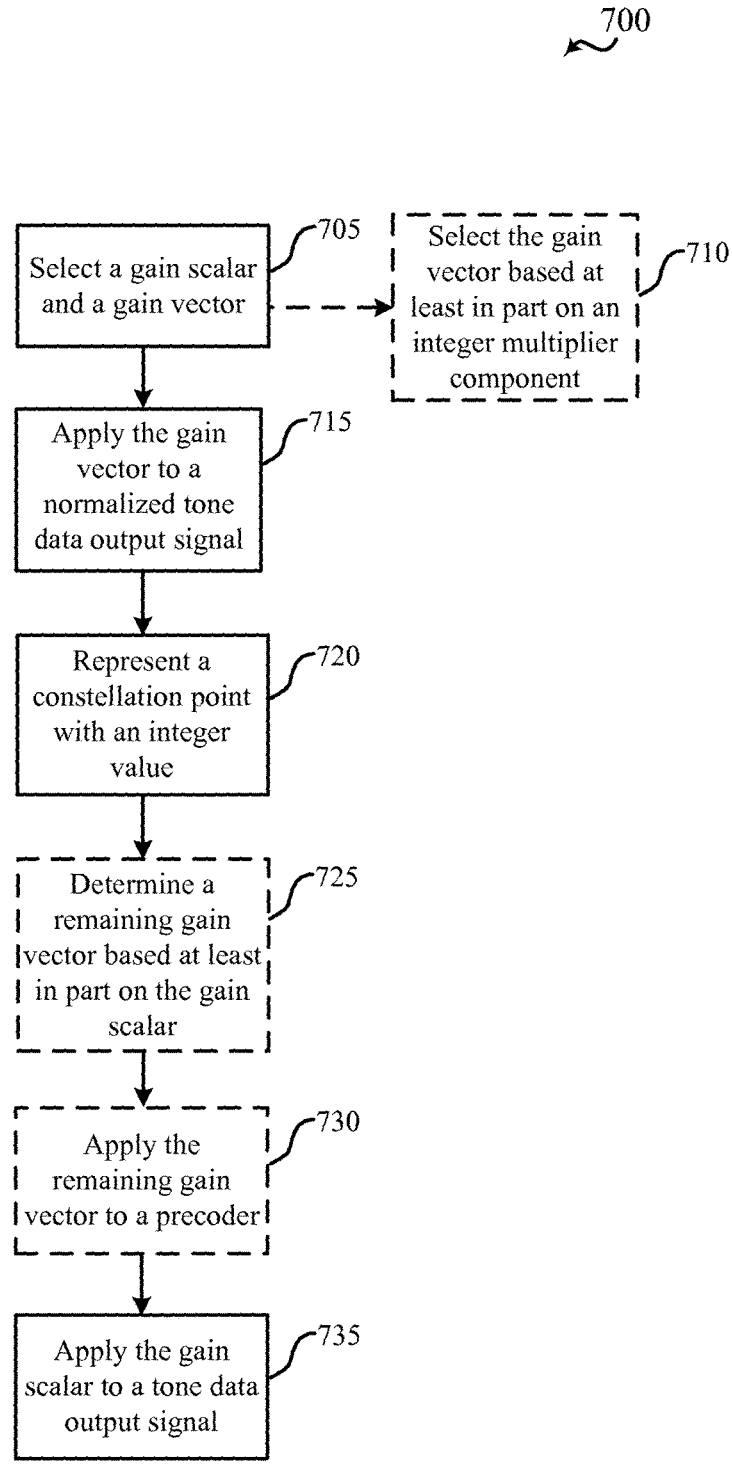
FIG. 7 shows a flow chart that illustrate examples of methods for reduced precision vector processing in accordance with various aspects of the present disclosure.

FIG. 7 shows a flow chart that illustrates one example of a method 700 for reduced precision vector processing in accordance with various aspects of the present disclosure. Method 700 may be performed by any of the components discussed in the present disclosure, but for clarity method 700 will be described from the perspective of line card 601 and vectoring card 651 of FIG. 6A. It is to be understood that method 700 is just one example of techniques for reducing the bit precision requirement of the signals input to the vector processor 120-*c*, thereby enabling the lossless (or near lossless) transportation of signals with reduced bandwidth at the vector processing interface. The operations of the method 700 may be rearranged, performed by other devices and component thereof, and/or otherwise modified such that other implementations are possible.

Broadly speaking, method 700 illustrates a procedure by which the bit precision requirement of signals (e.g., tone data signals) is reduced. While the bit precision is reduced, the techniques described in method 700 enable lossless (or near lossless) transportation of the signals that are input to the vector processor 120-*c*. To this end, method 700 includes techniques for partitioning the gain of the signals that are input to vector processor 120-*c*. Method 700 relates to the reduced precision vector processing architecture example provided in FIG. 2 and discussed herein.

At block 705, gain selector 625 of line card 601 selects a gain scalar (e.g., $\alpha[q]$). The gain scalar is selected based at least in part on a constellation point distance associated with constellation mapper 110-*c* for a particular line and a particular tone. Additionally, gain selector 625 selects a gain vector (e.g., $\chi[q]$). The gain vector is selected based at least in part on the gain scalar.

In one option, at block 710, gain selector 625 selects the gain vector based at least in part on an integer multiplier component. For example, the integer multiplier component of the gain vector can based on a function the constellation point distance and the gain scalar. In some examples, the integer multiplier component can be based at least in part on a rounding operation, a ceiling operation, an exponent of a rounding operation of a log value, or an exponent of a ceiling operation of a log value.

At block 715, gain component 630 of the line card 601 applies the gain vector to a normalized tone data output signal vector (e.g., x'[q, t]) of the constellation mapper 110-*c*. At block 720, constellation mapper 110-*c* represents a constellation point with integer values. Thus, by applying the gain vector to the constellation mapper output, the real axis and imaginary axis of a constellation point can be expressed as integer values.

At block 725, according to one option, gain selector 625 determines a remaining gain vector (e.g., G[q]) based at least in part on the gain scalar. According to one option, at block 730, gain component 630 applies the remaining gain vector to a precoder of the vector processor 120-*c* of the vectoring card 651. In some implementations, the gain component 630 provides the remaining gain vector to the vector processor 120-*c* and the remaining gain vector is applied to the precoder by the vector processor 120-*c* or another component of vectoring card 651. Additionally, in this option, the precoder can be a linear precoder.

At block 735, gain component 630 applies the gain scalar to a tone data output signal (e.g., y'[q, t]) of the vector processor 120-*c*. Similarly as discussed above, in some implementations, the gain component 630 provides the gain scalar to the vector processor 120-*c* and the gain scalar is applied to the tone data output signals by the vector processor 120-*c* or another component of vectoring card 651. In this manner, a lossless (or near lossless) tone data output signal (e.g., y[q, t]) can be transported with reduced bit precision and bandwidth.

Figure 8:
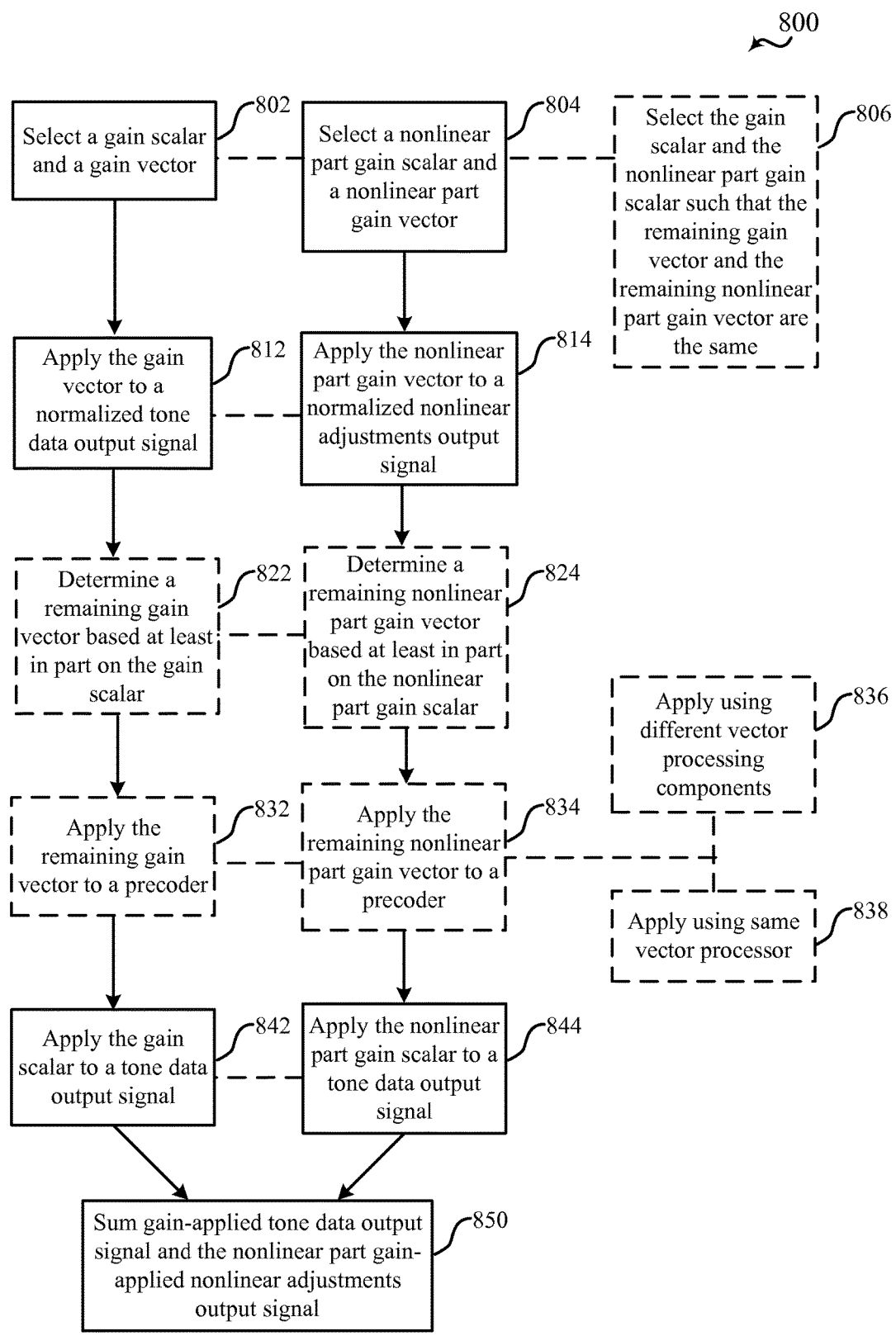
FIG. 8 shows a flow chart that illustrate examples of methods for reduced precision vector processing associated with NLP cases in accordance with various aspects of the present disclosure.

FIG. 8 shows a flow chart that illustrates one example of a method 800 for reduced precision vector processing associated with NLP cases in accordance with various aspects of the present disclosure. Method 800 may be performed by any of the components discussed in the present disclosure, but for clarity method 800 will be described from the perspective of line card 601 and vectoring card 651 of FIG. 6A. It is to be understood that method 800 is just one example of techniques for reducing the bit precision requirement of the signals input to the vector processor 120-*c*, thereby enabling the lossless (or near lossless) transportation of signals with reduced bandwidth at the vector processing interface. The operations of the method 800 may be rearranged, performed by other devices and component thereof, and/or otherwise modified such that other implementations are possible.

Broadly speaking, method 800 illustrates a procedure by which the bit precision requirement of signals (e.g., tone data signals) is reduced in the complex case where NLP is employed. While the bit precision is reduced, the techniques described in method 800 enable lossless (or near lossless) transportation of the signals that are input to the vector processor 120-*c*. To this end, method 800 includes techniques for partitioning the gain of the signals that are input to vector processor 120-*c*. Method 800 relates to the reduced precision vector processing architecture example provided in FIG. 5 and discussed herein. Additionally, aspects of method 800 can include parallel computation and processing of signals and is thus illustrated in such a parallel manner.

However, the parallel nature of the blocks of FIG. 8 is not necessarily indicative of timing or order of the execution of the processes described in these blocks.

At block 802, gain selector 625 of line card 601 selects a gain scalar. The gain scalar is selected based at least in part on a constellation point distance associated with constellation mapper 110-c for a particular line and a particular tone. Additionally, gain selector 625 selects a gain vector (e.g., $\chi[q]$), which is selected based at least in part on the gain scalar.

At block 804, gain selector 625 selects a nonlinear part gain scalar (e.g., $\beta[q]$). The nonlinear part gain scalar is selected based at least in part on a modulo size associated with the constellation mapper for the line and the tone. Additionally, gain selector 625 selects a nonlinear part gain vector (e.g., $\gamma[q]$) based at least in part on the nonlinear part gain scalar. In this regard, the nonlinear part gain scalar and the nonlinear part gain vector are associated with a nonlinear adjustments signal (e.g., s[q, t]). Moreover, gain selector 625 that selects the nonlinear part gain scalar and the nonlinear part gain vector can be a similar, but different gain selector of line card 601 than the gain selector 625 that selects the gain scalar and the gain vector at block 802.

In one option, at block 806, gain selector 625 selects the gain scalar and the nonlinear part gain scalar such that a remaining gain vector and a remaining nonlinear part gain vector (discussed with respect to block 822 and block 824, respectively) are the same. In this manner, certain computations for the tone data signal and the nonlinear adjustment signal can be performed using the same vector resources of the vector processor 120-c, for example, by operating the vector processor 120-c at a higher speed such that vector resources can switch between parallel and related computations. However, it is understood that the operations of block 806 are not necessary in implementations where vector processing resources of the vector processor 120-c are not to be shared or reused for the signal streams associated with the tone data signal and the nonlinear adjustment signal.

At block 812, gain component 630 of the line card 601 applies the gain vector to a normalized tone data output signal vector (e.g., x'[q, t]) of the constellation mapper 110-c. Additionally, as discussed in FIG. 7, constellation mapper 110-c can represent a constellation point with integer values by applying the gain vector to the constellation mapper output. At block 814, gain component 630 applies the nonlinear part gain vector to a normalized nonlinear adjustments signal vector (e.g., s'[q, t]).

At block 822, according to one option, gain selector 625 determines a remaining gain vector (e.g., G[q]) based at least in part on the gain scalar. At block 824, according to one option, gain selector 625 also determines a remaining nonlinear part gain vector (e.g., $\Psi[q]$) based at least in part on the nonlinear part gain scalar.

According to one option, at block 832, gain component 630 applies the remaining gain vector to a precoder of the vector processor 120-c of the vectoring card 651. In some implementations, the gain component 630 provides the remaining gain vector to the vector processor 120-c and the remaining gain vector is applied to the precoder by the vector processor 120-c or another component of vectoring card 651.

According to one option, at block 834, gain component 630 applies the remaining nonlinear part gain vector to a precoder of the vector processor 120-c of the vectoring card 651. In some implementations, the gain component 630 provides the remaining nonlinear part gain vector to the vector processor 120-c and the remaining nonlinear part gain vector is applied to the precoder by the vector processor 120-c or another component of vectoring card 651.

At block 836, according to one option, the remaining gain vector and the remaining nonlinear part gain vector may be applied using different vector processing resources or components. In this option, the remaining gain vector is applied to a precoder of a first vector processing component of the vector processor 110-c. The first vector processing component is used for processing an intermediate tone data signal vector (e.g., z[q, t]). The remaining nonlinear part gain vector is applied to a precoder of a second vector processing component of the vector processor 110-c, different from the first vector processing component. The second vector processing component is used for processing an intermediate nonlinear adjustments signal vector (e.g., u[q, t]). In this manner, two simultaneous signal streams are configured through the vector processor interface as input to vector processor 120-c.

At block 838, according to one option, the remaining gain vector and the remaining nonlinear part gain vector may be applied using the same vector processor resources or components. In this option, the remaining gain vector is applied to a precoder of the vector processor 120-c. For example, one or more resources or components of the vector processor 120-c are used for processing an intermediate tone data signal vector (e.g., z[q, t]) during a first time period. The remaining nonlinear part gain vector is applied to the precoder of the vector processor 110-c. During a second time period different from the first time period, the same one or more resources or components of the vector processor 120-c are used for processing an intermediate nonlinear adjustments signal vector (e.g., u[q, t]). Thus, the two signal streams associated with the tone data signal and the nonlinear adjustments signal are effectively configured as one signal stream through the vector processor interface as input to vector processor 120-c in a time-division manner.

As noted with respect to block 806, when the remaining gain vector and the remaining nonlinear part gain vector are the same, computations for the tone data signal and the nonlinear adjustment signal associated with applying the remaining gain vector and remaining nonlinear part gain vector can be performed using the same vector resources or components of the vector processor 120-c. In these cases, the vector processor 120-c is operated at a higher speed such that vector resources can switch between parallel and related computations during the first time period and the second time period described with respect to block 838.

At block 842, gain component 630 applies the gain scalar to a tone data output signal (e.g., y'[q, t]) of the vector processor 120-c. In some implementations, the gain component 630 provides the gain scalar to the vector processor 120-c and the gain scalar is applied to the tone data output signal by the vector processor 120-c or another component of vectoring card 651. At block 844, gain component 630 applies the nonlinear part gain scalar to a nonlinear adjustments output signal (e.g., v[q, t]) of vector processor 120-c. In some implementations, the gain component 630 provides the nonlinear part gain scalar to the vector processor 120-c and the nonlinear part gain scalar is applied to the nonlinear adjustments output signal by the vector processor 120-c or another component of vectoring card 651.

At block 850, summer 525-a of vectoring card 651 sums the gain-applied tone data output signal and the nonlinear part gain-applied nonlinear adjustments output signal. In this manner, by reducing the number of bits to represent the tone data signal, the nonlinear adjustments signal can be processed in parallel (e.g., by employing concurrent or alternating computations techniques) using extra or freed vector processing resource of the vector processor 120-c. Similar techniques with the same (or lesser) bit precision as used with respect to the tone data signal can be applied in processing the nonlinear adjustments signal by partitioning vector processing resource or components. Accordingly, a lossless (or near lossless) tone data signal (e.g., y[q, t]) that includes nonlinear adjustments can be transported with reduced bit precision and bandwidth by reusing the extra or freed vector processing resources.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these.

Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wired communication comprising:
  selecting a gain scalar based at least in part on a constellation points distance associated with a constellation mapper for a line and a tone;
  selecting a gain vector based at least in part on the gain scalar;
  applying the gain scalar to a tone data output signal of a vector processor; and
  applying the gain vector to a normalized tone data output signal vector of the constellation mapper.

2. The method of claim 1, further comprising:
  selecting the gain vector based at least in part on an integer multiplier component.

3. The method of claim 2, further comprising:
  determining the integer multiplier component based at least in part on a member of a group consisting of: a rounding operation, a ceiling operation, an exponent of a rounding operation of a log value, and an exponent of a ceiling operation of a log value.

4. The method of claim 1, further comprising:
  determining a remaining gain vector based at least in part on the gain scalar; and applying the remaining gain vector to a precoder of the vector processor.

5. The method of claim 1, further comprising:
representing a constellation point of the constellation mapper with integer values.

6. The method of claim 1, further comprising:
selecting a nonlinear part gain scalar based at least in part on a modulo size associated with the constellation mapper for the line and the tone; and
applying the nonlinear part gain scalar to a nonlinear adjustments output signal of the vector processor.

7. The method of claim 6, wherein the vector processor comprises a first vector processing unit for processing an intermediate tone data signal vector and a second vector processing unit for processing an intermediate nonlinear adjustments signal vector.

8. The method of claim 6, further comprising:
selecting a nonlinear part gain vector based at least in part on the nonlinear part gain scalar; and
applying the nonlinear part gain vector to a normalized nonlinear adjustments output signal vector of a nonlinear precoding processor.

9. The method of claim 6, further comprising:
summing the gain-applied tone data output signal and the nonlinear part gain-applied nonlinear adjustments output signal.

10. The method of claim 6, further comprising:
determining a remaining gain vector based at least in part on the gain scalar; and
determining a remaining nonlinear part gain vector based at least in part on the nonlinear part gain scalar.

11. The method of claim 10, further comprising:
applying the remaining gain vector to a precoder of a first vector processing component of the vector processor for processing an intermediate tone data signal vector; and
applying the remaining nonlinear part gain vector to a precoder of a second vector processing component of the vector processor for processing an intermediate nonlinear adjustments signal vector.

12. The method of claim 10, further comprising:
selecting the gain scalar and the nonlinear part gain scalar such that the remaining gain vector and the remaining nonlinear part gain vector are the same;
applying the remaining gain vector to a precoder of the vector processor; and
applying the remaining nonlinear part gain vector to the precoder of the vector processor at a different time than applying the remaining gain vector.

13. A wired communication device comprising:
a constellation mapper;
a vector processor;
a gain selector to select a gain scalar based at least in part on a constellation point distance associated with the constellation mapper for a line and a tone and select a gain vector based at least in part on the gain scalar; and
at least on gain component to apply the gain scalar to a tone data output signal of the vector processor and apply the gain vector to a normalized tone data output signal vector of the constellation mapper.

14. The wired communication device of claim 13, wherein the gain selector is further to determine a remaining gain vector based at least in part on the gain scalar; and wherein the at least one gain component is further to apply the remaining gain vector to a precoder of the vector processor.

15. The wired communication device of claim 13, wherein the gain selector is further to select a nonlinear part gain scalar based at least in part on a modulo size associated with the constellation mapper for the line and the tone; and wherein the at least one gain component is further to apply the nonlinear part gain scalar to a nonlinear adjustments output signal of the vector processor.

16. The wired communication device of claim 15, wherein the vector processor comprises a first vector processing component for processing an intermediate tone data signal vector and a second vector processing component for processing an intermediate nonlinear adjustments signal vector.

17. The wired communication device of claim 15, wherein the gain selector is further to select a nonlinear part gain vector based at least in part on the nonlinear part gain scalar; and wherein the at least one gain component is further to apply the nonlinear part gain vector to a normalized nonlinear adjustments output signal vector of a nonlinear precoding processor.

18. The wired communication device of claim 15, further comprising:
a summer to sum the gain-applied tone data output signal and the nonlinear part gain-applied nonlinear adjustments output signal.

19. The wired communication device of claim 13, wherein the vector processor is a digital subscriber line (DSL) vector processing component.

20. A wired communication device comprising:
means for selecting a gain scalar based at least in part on a constellation points distance associated with a constellation mapper for a line and a tone;
means for selecting a gain vector based at least in part on the gain scalar;
means for applying the gain scalar to a tone data output signal of a vector processor; and
means for applying the gain vector to a normalized tone data output signal vector of the constellation mapper.

21. The wired communication device of claim 20, further comprising:
means for determining a remaining gain vector based at least in part on the gain scalar; and
means for applying the remaining gain vector to a precoder of the vector processor.

22. The wired communication device of claim 20, further comprising:
means for selecting a nonlinear part gain scalar based at least in part on a modulo size associated with the constellation mapper for the line and the tone; and
means for applying the nonlinear part gain scalar to a nonlinear adjustments output signal of the vector processor.

23. The wired communication device of claim 22, wherein the vector processor comprises means for processing an intermediate tone data signal vector and processing an intermediate nonlinear adjustments signal vector.

24. The wired communication device of claim 22, further comprising:
means for selecting a nonlinear part gain vector based at least in part on the nonlinear part gain scalar; and
means for applying the nonlinear part gain vector to a normalized nonlinear adjustments output signal vector of a nonlinear precoding processor.

25. The wired communication device of claim 22, further comprising:

means for summing the gain-applied tone data output signal and the nonlinear part gain-applied nonlinear adjustments output signal.

26. The wired communication device of claim 20, wherein means for applying the gain scalar to a tone data output signal of a vector processor comprises means for applying the gain scalar to a tone data output signal of a digital subscriber line (DSL) vector processor.

27. A non-transitory computer readable medium comprising computer-readable code that, when executed, causes a device to:
- select a gain scalar based at least in part on a constellation points distance associated with a constellation mapper for a line and a tone;
- select a gain vector based at least in part on the gain scalar;
- apply the gain scalar to a tone data output signal of a vector processor; and
- apply the gain vector to a normalized tone data output signal vector of the constellation mapper.

* * * * *